Dec. 24, 1968    R. GILMONT    3,417,622
PRESSURE GAUGE
Filed May 17, 1966
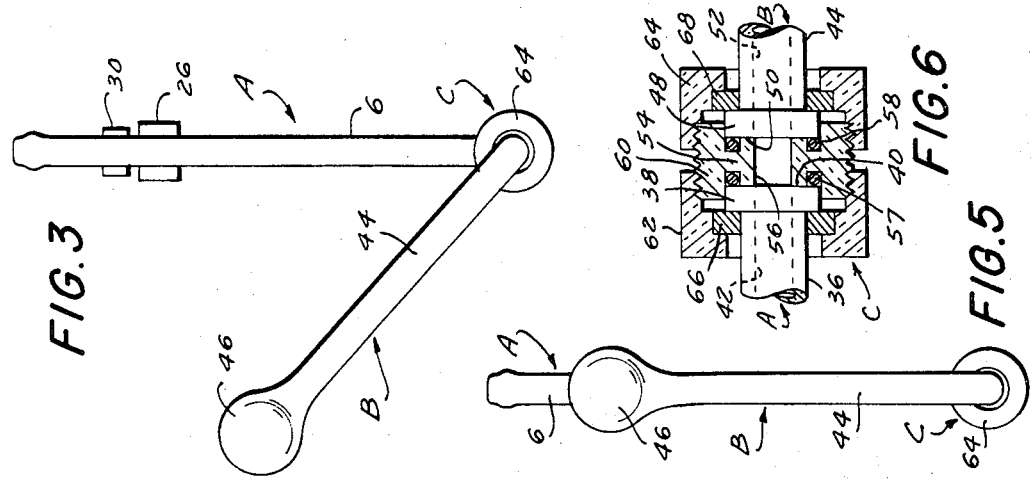
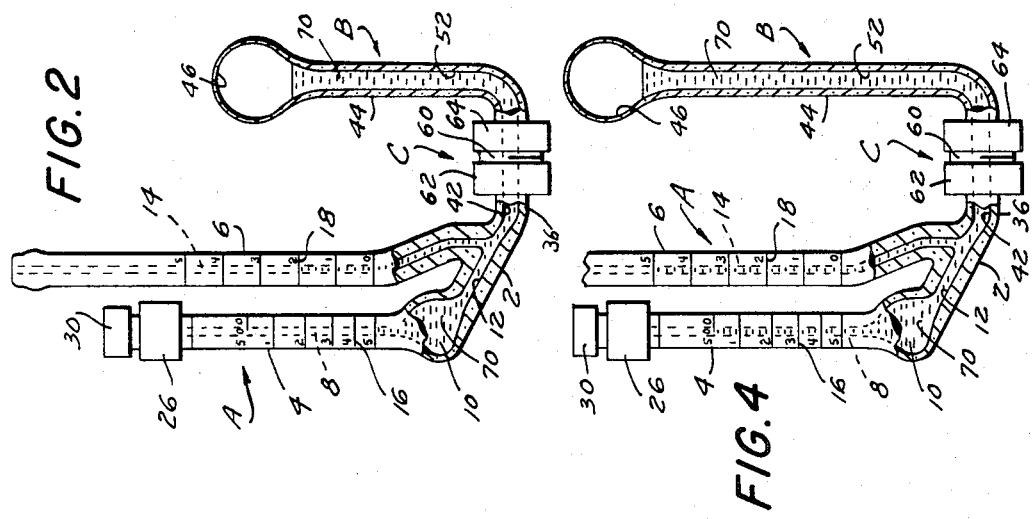
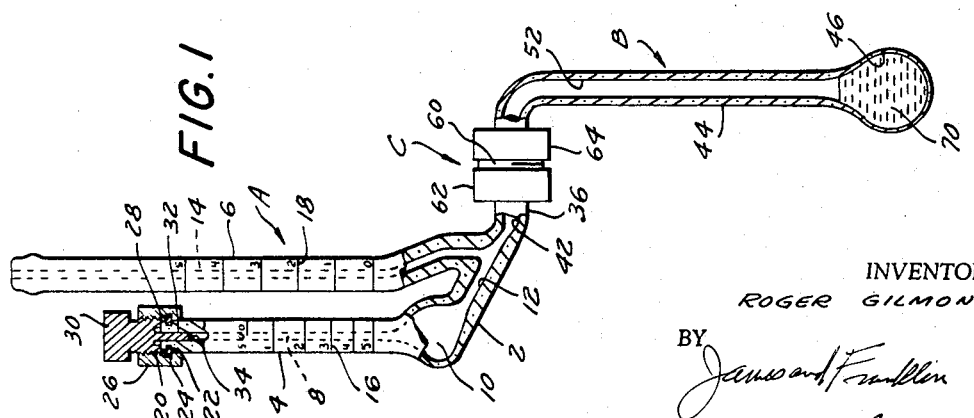
INVENTOR.
ROGER GILMONT
BY
ATTORNEY United States Patent Office 3,417,622
Patented Dec. 24, 1968

3,417,622
PRESSURE GAUGE
Roger Gilmont, Douglaston, N.Y., assignor to Roger Gilmont Instruments, Inc., Great Neck, N.Y., a corporation of New York
Filed May 17, 1966, Ser. No. 550,654
15 Claims. (Cl. 73—400)

ABSTRACT OF THE DISCLOSURE

A pressure gauge comprising a fixed pressure-measuring assembly designed to function with a supply of measuring liquid adapted to be fed to and drained from said assembly, said liquid being adapted to be contained within a reservoir which is rigidly pivotally mounted on said assembly so as to be pivotally movable from an inoperative position progressively through a plurality of operative positions, the reservoir portion of the equipment preferably being removable therefrom for cleaning purposes.

The present invention relates to a pressure measuring gauge adapted to be fixedly mounted and provided with a movable part which carries a reservoir for a supply of liquid which is used in conjunction with the pressure measuring procedure. It is especially, although not exclusively, adapted for use in the measurement of vacuum.

A type of pressure gauge is known which is adapted to be tilted between an at-rest position and a measuring position, in the former of which communication is established between the inner portion of the gauge and the system where pressure is to be measured, and in the latter of which a volume of gas from the external system is trapped in said inner gauge portion and compressed to a predetermined degree, the difference between the pressure of the trapped gas and the pressure of the system giving an indication of the system pressure. That tilting type of gauge is simple and inexpensive, but it presents certain operational problems which greatly limit its applicability. Because it had to be tilted it could not be rigidly connected to the system under test, with consequent complexity of installation and danger of leaking. The pressure readings would vary with different inclinations of the gauge, thus constituting a source of inaccuracy. In an attempt to compensate for this tendency toward inaccuracy, the devices were made of comparatively large size, thus adding to cost and detracting from adaptability.

The prime object of the instant invention is to provide a gauge which combines the simplicity of the tilting-type gauge with a higher degree of accuracy, adaptability and dependability, all at no appreciable increase in cost. It is a further prime object of the present invention to devise such a gauge which is small, compact, easily manipulated, and easily cleaned.

To those ends, the gauge of the present invention comprises a relatively fixed body and a second body mounted on and movable relative to the fixed body. The fixed body contains passages defining the inner portion of the gauge which are adapted to communicate with the system under test and are also adapted to receive a suitable gas-trapping and pressure-measuring liquid. The movable body includes a reservoir for that liquid and means for establishing fluid communication between the reservoir and the passages in the fixed body. The movable body is so mounted on the fixed body that the height of its reservoir relative to the fixed body may be varied. With the reservoir in its lowered position all of the liquid flows into the reservoir, leaving the passages in the reservoir open to the system under test. When the reservoir is raised the liquid contained therein flows into the passages in the fixed body, thus trapping a volume of gas in said passages and conditioning the gauge for pressure measuring. The reservoir may be variably positioned relative to the fixed body so as to produce different modes of pressure measurement, all under the ready control of the operator. The fixed and movable bodies are readily connected to and disconnected from one another, thus facilitating cleaning and insertion, removal or replacement of the pressure-measuring liquid.

A pair of passages are preferably provided in the fixed body, each having an associated graduated scale for measurement of a liquid height. It is preferred that one of those scales be linear and the other non-linear, with the appropriate scale being selected for measurement by appropriate positioning of the reservoir.

Because the fixed body may be rigidly mounted it may be permanently and rigidly connected to the system under test in a thoroughly reliable and dependable manner. Its vertical orientation need be achieved but once, after which it may be permanently fixed in position and will thereafter give accurate readings entirely independently of movement of the movable body relative to the fixed body.

When the fixed body is provided with a passage having a blocked end, in which a predetermined volume of gas is designed to be trapped and compressed, a very high degree of measurement accuracy is produced by blocking the end of the passage with a plug the tip of which is shaped to correspond to the meniscus of the pressure-measuring liquid, in this way eliminating such reading error as might otherwise be produced by the non-planar upper surface of the column of liquid in that passage.

To the accomplishment of the above, and to such other objects as may hereinafter appear, the present invention relates to the construction of a pressure gauge as defined in the appended claims and as described in this specification, taken together with the accompanying drawings, in which:

FIG. 1 is an elevational view, partially broken away, of one embodiment of the present invention, showing the movable part in its at-rest, reservoir-lowered position;

FIG. 2 is a view similar to FIG. 1 but showing the movable part in a position such that the reservoir is in a partially raised position, the gauge being thus condition to measure pressure in a predetermined mode;

FIG. 3 is a side elevational view of the gauge of FIG. 2;

FIG. 4 is a view similar to FIG. 2 but showing the movable part in a position such that the reservoir is in its fully raised position, the gauge being then conditioned to measure pressure in a different mode;

FIG. 5 is a side elevational view of the gauge of FIG. 4; and

FIG. 6 is a cross sectional view on an enlarged scale of the assembly which couples the two bodies to one another.

The gauge comprises a relatively fixed body generally designated A and a relatively movable body generally designated B, coupled one to the other by an assembly generally designated C.

The fixed body A, which may be mounted in any appropriate fashion, comprises a body portion 2 from which tubes 4 and 6 extend upwardly. The tube 4 has a central passage 8 which communicates at its bottom with a bulbous gas-trapping section 10 which in turn communicates with a passage 12 in the body portion 2. The tube 6 is provided with a passage 14 which communicates with the passage 12 in the body portion 2. The upper ends of the tubes 4 and 6 are open, exposing their passages 8 and 14 respectively. The tubes 4 and 6 are provided with graduated scales 16 and 18 respectively, the scale 16 being non-linear; as shown its upper portion is graduated in terms of millimeters of mercury. The scale 18 is linear, and as shown is graduated in terms of millimeters of mercury. (The illustrated graduations are for use in conjunction with mercury as the measuring liquid. If some other liquid is employed for that purpose, the calibration of the scales 16 and 18 would, of course, be different.)

The upper end of the tube 6 is adapted to be connected in any appropriate fashion with the system the pressure in which is to be measured. The upper end of the tube 4 is provided with a flange 20 beneath which is a groove 22 in which a plug ring 24 is received, that ring extending out radially beyond the flange 20. An internally threaded nut 26 engages the underside of the plug ring 24 and extends above the upper end of the tube 4. It carries an O-ring 28 which is sealingly engaged by a plug 30 which is threadedly received inside the nut 26 and has a downwardly extending part 32 which is received snugly within the passage 8 and is provided with a tip 34, the shape of the tip 34 corresponding volumetrically to the volume of the meniscus defined by the particular measuring liquid which is employed (e.g. mercury).

Extending laterally from the portion 2 of the fixed body A is a tube 36 having a flanged portion 38 terminating in an end surface 40. A passage 42 extends from the surface 40 to and in communication with the passages 12, 14, and 8.

The movable body B comprises a tubular portion 44 terminating at one end in a bulbous reservoir 46 and at its other end terminating in a flanged portion 48 having an end surface 50. A passage 52 extends from the surface 50 to and in communication with the reservoir 46.

The coupling assembly comprises a coupler body having a part 54 adapted to be located between the flanged portions 38 and 48 of the bodies A and B respectively, that part 54 being provided with a central aperture 56 which provides for fluid communication between the passages 42 and 52 in the bodies A and B respectively. O-rings 57 and 58 are carried by the part 54 surrounding the ends of the aperture 56, said O-rings sealingly engaging the end surfaces 40 and 50 of the flanged portions 38 and 48 respectively.

Extending radially outwardly from the part 54, and projecting to either side over the flanges 38 and 48, is an externally threaded portion 60 over which coupling nuts 62 and 64 are adapted to be threaded, those nuts engaging the axially outer surfaces of the flanged portions 38 and 48 respectively via rings 66 and 68 respectively. Thus by screwing the nuts 62 and 64 onto the externally threaded portion 60 the fixed and movable bodies A and B are clamped and secured to the part 54, and hence to one another. When the nut 64 is loosened, the movable body is permitted to pivot about the axis of the aperture 56, tightening of the nut 64 reclamping the movable body B in adjusted pivoted position.

The bodies A and B may be formed of glass. The plug 30 and the coupling assembly C may be formed of plastic. The pressure-measuring liquid, shown in FIG. 1 completely in the reservoir 46, and identified by the reference numeral 70, may be of any of a variety of known suitable compositions. Mercury is preferred.

In use the movable body B is first disconnected from the fixed body A by completely unscrewing the nut 64 from the threaded portion 60. Then, through the end of the passage 52, the desired amount of pressure-measuring liquid 70 is inserted into the passage 52 and flows into the reservoir 70. The movable part B is then reconnected to the fixed part A by screwing the nut 64 back onto the threaded portion. The movable body B is positioned in its standby or at-rest position shown in FIG. 1, in which the reservoir 46 is located below the coupling assembly C and all of the liquid 70 is in the reservoir 46 or the lower portion of the passage 52. It is a feature of the present device that the amount of pressure measuring fluid 70 employed is not critical; there must be enough of it so that the pressure measuring operations subsequently to be described can be carried out, but because of the manner in which the gauge is manipulated there may be more than enough liquid 70 without any adverse effect on the functioning or accuracy of the gauge.

When the pressure in a system connected to the upper end of the tube 6 is to be measured, one of two procedures may be followed, depending upon the degree of accuracy required and the magnitude of the vacuum involved. When the pressure involved is the equivalent of 1 millimeter of mercury or more, taking a reading on the linear scale 18 will usually be satisfactory. This measurement mode is illustrated in FIGS. 2 and 3. The movable part B is pivoted about the axis of the coupling assembly C, thereby raising the reservoir 46 to a position higher than the coupling assembly C. As this is done the pressure measuring liquid 70 will flow from the reservoir 46 through the passage 52 and the aperture 56 in the coupling part 54 into the passages 42, 14, 12, 10 and 8 of the fixed body A. Before the pressure measuring liquid reaches the passage 12 both the passages 8 and 14 will be filled with gas from the system under test. The upper end of the passage 8 is closed and sealed by the plug 30, and the tip 34 of the portion 32 is located at the top of the scale 16, with the shaped part 34 of that tip extending down below the topmost graduation of that scale. As liquid flows into the passage 42 and 12 the gas to the left of the intersection of the passages 12 and 14 will be trapped and forced up into the passage 8, thus becoming compressed so that its pressure increases. The movable part 2 is pivoted until, as shown in FIG. 2, the upper level of the liquid 70 in the passage 8 just reaches the lowermost graduation on the scale 16. This will produce a predetermined degree of compression of the trapped gas, and therefore will raise its pressure by a predetermined and known factor. The upper level of the liquid 70 in the passage 14, however, acts against the lower pressure of the system under test. As a result it will be forced to a higher level than the liquid in the passage 8, and the difference between the two levels will be a measure of the system pressure. Thus, in the assembly illustrated in FIG. 2, where the upper level of the liquid 70 in the passage 14 is at the graduation corresponding to the number two, a pressure of 2 millimeters of mercury is indicated.

If one wishes to check this reading or, more usually, if more intense degrees of vacuum are to be measured, such as those involving a pressure of less than 1 millimeter of mercury, the movable body B is pivoted beyond its position shown in FIGS. 2 and 3 to its position shown in FIGS. 4 and 5, in which the reservoir 46 is higher, relative to the coupling assembly C, than in FIGS. 2 and 3. As a result more liquid will flow from the body B into the body A, and the levels of liquid 70 in the passages 14 and 8 will rise. For the more accurate measurement mode now being discussed the pivoted position of the body B should be adjusted until the level of the liquid 70 in the passage 14 comes just opposite the uppermost graduation on the scale 18. The level of the liquid 70 in the passage 8 will also have risen, thereby further compressing the volume of gas trapped within the passage 8 and further increasing its pressure. The level of the liquid 70 in the passage 8 is read against the non-linear scale 16, that scale indicating the pressure of the gas in its initial condition, and hence the pressure in the system under test. In the example illustrated in FIG. 4 a pressure of 500 microns is indicated.

It is, of course, well known that the level of the liquid in the passages 8 and 14 is not planar, but instead is concave, or convex, depending upon the liquid involved, defining a meniscus. The graduations are usually read at the bottom of a concave meniscus or the top of a convex meniscus, in which case there is a small volume of liquid extending above or below that level. This normally constitutes a source of error, and the smaller the actual volume of the trapped gas in the passage 8 the more significant does this error become under normal circumstances. In the illustrated gauge, however, this error is greatly minimized because of the shaping of the tip 34 of the part 32 which closes off the upper end of the passage 8. Since that portion 44 has a shape corresponding volumetrically to the meniscus characteristics of the liquid 70, compensation for the meniscus shape of the measuring liquid is accomplished.

After a measurement has been taken, the movable body B is returned to its at-rest position shown in FIG. 2, the pressure measuring liquid 70 flows out from the body A and into the reservoir 46, and the gauge is conditioned for another measurement whenever that is desired.

Since the body A is fixed, it may be permanently and, if desired, rigidly connected to the system under test. Also, once it is accurately located, with the passages 8 and 14 vertical, it will remain in that position; there is no necessity for constant checking of the level of the gauge each time that a measurement is taken.

The combination of the linear scale 18 with the non-linear scale 16 produces a high degree of measurement accuracy in a very short physical length, so that the instrument itself can be made smaller than has heretofore been thought practical. Variations in the amount of pressure measuring liquid 70 within the device are readily compensated for in adjusting the pivotal position of the movable body B relative to the fixed body A, and there is no predetermined position for the movable body B which is required for an accurate measurement. The proper position of the movable part B is empirically determined in all instances, as indicated either by the level of the liquid in passage 8 or the level of the liquid in passage 14, depending upon whether measurement on the linear scale 18 or the non-linear scale 16 is desired.

O-ring seals are provided throughout, thereby reliably producing a vacuum-tight characteristic. The parts involved are relatively simple and inexpensive, and they may be readily removed, cleaned and replaced.

While but a single embodiment of the present invention has been here specifically disclosed, it will be apparent that many variations may be made therein, all within the scope of the instant invention as defined in the following claims.

I claim:

1. A pressure gauge comprising a relatively fixed body having a port, a first passage, a second passage, and fluid communication means between one end of each of said passages and said port, means for closing the other end of said second passage, the other end of said first passage being adapted to be connected to a source the pressure of which is to be measured, a second body, and means for mounting said second body on said first body, said second body having a reservoir and passage in fluid communication with said port when said second body is mounted on said first body, said reservoir being adapted to contain a supply of liquid, said mounting means being effective to permit said second body to be moved relative to said first body so as to raise and lower said reservoir relative to said port, thereby to cause liquid in said reservoir to enter and leave said passages, said mounting means being rigidly effective to pivotally mount said second body on said fixed body adjacent said port, said reservoir being located radially remote from said port and swinging about said port as said second body is pivoted relative to said fixed body, said gauge being adapted to be used in conjunction with scale means associated with said passages for reading the level of liquid in said passages.

2. The gauge of claim 1, in which said second body is removably mounted on said fixed body.

3. The gauge of claim 1, in which said means for closing said other end of said second passage comprises an element projecting into said passage and having a tip shaped to correspond volumetrically with the meniscus of the liquid adapted to be received in said reservoir.

4. In the gauge of claim 1, graduated scales on said body in cooperative relationship with said passages, whereby the level of liquid in said passages may be read, one of said scales being linear and the other non-linear.

5. The gauge of claim 1, in which the port-carrying portion of said fixed body and the passage-carrying portion of said second body are provided with flange parts having facing surfaces to which said port and passage respectively extend, said mounting means comprising an apertured element disposed between said facing surfaces with its aperture communicating between said port and passage, sealing means on said element engaging said facing surfaces around said port and passage respectively, said element having an exposed portion located between said flanged parts, and securing members operatively engaging said flanged parts of said bodies respectively and said exposed portion of said element, thereby to retain said facing surfaces in engagement with said element and the sealing means carried thereby and permitting relative pivotal movement of said bodies.

6. The gauge of claim 1, in which the port-carrying portion of said fixed body and the passage-carrying portion of said second body are provided with flange parts having facing surfaces to which said port and passage respectively extend, said mounting means comprising an apertured element disposed between said facing surfaces with its aperture communicating between said port and said passage, sealing means on said element engaging said facing surfaces around said port and passage respectively, said element having an exposed portion located between said flanged parts, and securing members operatively engaging said flanged parts of said bodies respectively and said exposed portion of said element, thereby to retain said facing surfaces in engagement with said element and the sealing means carried thereby and permitting relative pivotal movement of said bodies, and in which said means for closing said other end of said second passage comprises an element projecting into said passage and having a tip shaped to correspond volumetrically with the meniscus of the liquid adapted to be received in said reservoir.

7. The gauge of claim 1, in which the port-carrying portion of said fixed body and the passage-carrying portion of said second body are provided with flanged parts having facing surfaces to which said port and passage respectively extend, said mounting means comprising an apertured element disposed between said facing surfaces with its aperture communicating between said port and said passage, sealing means on said element engaging said facing surfaces around said port and passage respectively, said element having an exposed portion located between said flanged parts, and securing members operatively engaging said flanged parts of said bodies respectively and said exposed portion of said element, thereby to retain said facing surface in engagement with said element and the sealing means carried thereby and permitting relative pivotal movement of said bodies, and in which there are graduated scales on said body in cooperative relationship with said passages, whereby the level of liquid in said passages may be read, one of said scales being linear and the other non-linear.

8. The gauge of claim 1, in which the port-carrying portion of said fixed body and the passage-carrying portion of said second body are provided with flanged parts having facing surfaces to which said port and passage respectively extend, said mounting means comprising an apertured element disposed between said facing surfaces with its aperture communicating between said port and said passage, sealing means on said element engaging said facing surfaces around said port and passage respectively, said element having an exposed portion located between said flanged parts, and securing members operatively engaging said flanged parts of said bodies respectively and said exposed portion of said element, thereby to retain said facing surfaces in engagement with said element and the sealing means carried thereby and permitting relative pivotal movement of said bodies, in which said means for closing said other end of said second passage comprises an element projecting into said passage and having a tip shaped to correspond volumetrically with the meniscus of the liquid adapted to be received in said reservoir, and in which there are graduated scales on said body in cooperative relationship with said passages, whereby the level of liquid in said passages may be read, one of said scales being linear and the other non-linear.

9. The gauge of claim 1, in which said second body is removably mounted on said fixed body, and in which said means for closing said other end of said second passage comprises an element projecting into said passage and having a tip shaped to correspond volumetrically with the meniscus of the liquid adapted to be received in said reservoir.

10. The gauge of claim 1, in which said second body is removably mounted on said fixed body, and in which there are graduated scales on said body in cooperative relationship with said passages, whereby the level of liquid in said passages may be read, one of said scales being linear and the other non-linear.

11. The gauge of claim 1, in which said second body is removably mounted on said fixed body, said means for closing said other end of said second passage comprises an element projecting into said passage and having a tip shaped to correspond volumetrically with the meniscus of the liquid adapted to be received in said reservoir, and in which there are graduated scales on said body in cooperative relationship with said passages, whereby the level of liquid in said passages may be read, one of said scales being linear and the other non-linear.

12. The gauge of claim 1, in which said means for closing said other end of said second passage comprises an element projecting into said passage and having a tip shaped to correspond volumetrically with the meniscus of the liquid adapted to be received in said reservoir, and in which there are graduated scales on said body in cooperative relationship with said passage, whereby the level of liquid in said passages may be read, one of said scales being linear and the other non-linear.

13. A pressure gauge comprising a relatively fixed body having a port, a first passage, a second passage, and fluid communication means between one end of each of said passages and said port, means for closing the other end of said second passage, the other end of said first passage being adapted to be connected to a source the pressure of which is to be measured, a second body, and means for mounting said second body on said first body, said second body having a reservoir and passage in fluid communication with said port when said second body is mounted on said first body, said reservoir being adapted to contain a supply of liquid, said mounting means being effective to permit said second body to be moved relative to said first body so as to raise and lower said reservoir relative to said port, thereby to cause liquid in said reservoir to enter and leave said passages, said second body being removably mounted on said fixed body, said means for closing said other end of said second passage comprising an element projecting into said passage and having a tip shaped to correspond volumetrically with the meniscus of the liquid adapted to be received in said reservoir, and in which there are graduated scales on said body in cooperative relationship with said passages, whereby the level of liquid in said passages may be read, one of said scales being linear and the other non-linear.

14. A pressure gauge comprising a relatively fixed body having a port, a first passage, a second passage, and fluid communication means between one end of each of said passages and said port, means for closing the other end of said second passage, the other end of said first passage being adapted to be connected to a source the pressure of which is to be measured, a second body, and means for mounting said second body on said first body, said second body having a reservoir and passage in fluid communication with said port when said second body is mounted on said first body, said reservoir being adapted to contain a supply of liquid, said mounting means being effective to permit said second body to be moved relative to said first body so as to raise and lower said reservoir relative to said port, thereby to cause liquid in said reservoir to enter and leave said passages, in which said means for closing said other end of said second passage comprises an element projecting into said passage and having a tip shaped to correspond volumetrically with the meniscus of the liquid adapted to be received in said reservoir.

15. In the gauge of claim 14, graduated scales on said body in cooperative relationship with said passages, whereby the level of liquid in said passages may be read, one of said scales being linear and the other non-linear.

References Cited

OTHER REFERENCES

Barr et al.: "Scientific Glass Blowing and Laboratory Techniques," Instruments, vol. 19, pp. 666–668, 670, 672, 674, 676, 678.

S. CLEMENT SWISHER, *Acting Primary Examiner.*

DONALD O. WOODIEL, *Assistant Examiner.*